United States Patent [19]
Kennedy et al.

[11] Patent Number: 6,101,419
[45] Date of Patent: Aug. 8, 2000

[54] MODULAR CONTROL SYSTEM FOR MANUFACTURING FACILITY

[75] Inventors: Robert D. Kennedy, San Jose; Donald P. Richmond, II, Palo Alto; Thane M. Koontz, Morganhill; Thomas W. Anderson, Livermore, all of Calif.

[73] Assignee: Lam Research Corporation, Fremont, Calif.

[21] Appl. No.: 09/007,378

[22] Filed: Jan. 15, 1998

[51] Int. Cl.$^7$ ..................................................... G05B 15/00
[52] U.S. Cl. .................................. 700/3; 700/9; 700/17; 700/83; 700/25; 704/102; 704/103; 704/104
[58] Field of Search ................................... 700/3, 4, 5, 9, 700/725, 108, 110, 48, 49, 53, 121; 709/102, 103, 104; 707/503, 504; 712/34, 35, 36

[56] References Cited

U.S. PATENT DOCUMENTS

| | | | |
|---|---|---|---|
| 4,695,946 | 9/1987 | Andreasen et al. | 700/3 |
| 4,910,658 | 3/1990 | Dudash et al. | 700/9 |
| 4,999,768 | 3/1991 | Hirokawa | 364/200 |
| 5,105,362 | 4/1992 | Kotani | 700/121 |
| 5,193,189 | 3/1993 | Flood et al. | 709/103 |
| 5,226,118 | 7/1993 | Baker et al. | 707/503 |
| 5,345,389 | 9/1994 | Calvin et al. | 364/473 |
| 5,390,351 | 2/1995 | Di Giulio et al. | 395/725 |
| 5,481,456 | 1/1996 | Ogura | 364/424 |
| 5,598,149 | 1/1997 | Schreiter et al. | 700/9 |
| 5,754,780 | 5/1998 | Asakawa et al. | 395/200 |
| 5,777,874 | 7/1998 | Flood et al. | 700/82 |
| 5,801,942 | 9/1998 | Nixon et al. | 700/32 |
| 5,809,320 | 9/1998 | Jain et al. | 712/34 |
| 5,940,293 | 8/1999 | Schwenke et al. | 700/9 |

FOREIGN PATENT DOCUMENTS 07-212407  12/1995  Japan .

*Primary Examiner*—Paul P. Gordon
*Assistant Examiner*—Ramesh Patel
*Attorney, Agent, or Firm*—Cesari and McKenna, LLP

[57] ABSTRACT

A modular control system for an automated manufacturing facility, especially for use with a semiconductor fabrication facility having a number of discrete process components, provides a master control computer connected by a parallel bus to a series of modular interface cards. Each of the interface cards are organized to communicate with all the I/O located on a specific process component or group of process components. A plurality of daughter cards are provided on each of the interface cards. The daughter cards contain data translation and acquisition circuitry for translating the various forms of I/O signals from and into a database format. The signal list used to communicate between the master computer and the I/O is generated at startup, enabling easy modification, addition and deletion of I/O. Network-based communication protocols can also be employed for communication between the interface cards and the master computer.

13 Claims, 11 Drawing Sheets

MODULAR CONTROL SYSTEM FOR MANUFACTURING FACILITY

FIELD OF INVENTION

This invention relates to a modular computer control system for an automated manufacturing facility having a plurality of separate operating components in which corresponding control modules are provided, each linked to a master control computer, and more particularly to a system for use in a semiconductor fabrication facility.

BACKGROUND OF INVENTION

Complex automated manufacturing facilities employ a large number of individual processing components including robotic devices, sensors, environmental controls, pneumatic valves and other electronic input/output devices. Devices for the fabrication of semiconductor microcircuit wafers, in particular, require a rather complex web of electronic input and output signals to be passed between the master control computer and a myriad of remote sensors and process components. These signals, for example, control the movement of semiconductor wafers into and out of process chambers, control a multiplicity of valves that regulate process gasses and vacuum pressures, monitor and control process temperature, operate several electromechanical and pneumatic robot manipulators, regulate power supplies, monitor safety levels and transmit warnings and a variety of other important tasks in the semiconductor fabrication facility.

Users of semiconductor fabrication equipment in the US and abroad have unique process requirements that vary greatly based upon the country and individual users. There may be differing process parameter requirements, differing power supply needs, specific environmental and safety regulations that must be observed, and even different spoken language requirements. Makers of fabrication facilities have been forced to spend substantial time and resources meeting the specific needs of their purchasers, providing highly customized control systems that are, essentially, one-user units, and that are not readily adaptable to other users' with differing needs.

The customized nature of fabricating facilities is amplified by organizational structure of most control systems. Generally, control systems comprise a number of control cables routed directly to the master computer, sometimes with intervening control cards that perform minor data handling functions. However, the bulk of input/output ("I/O" herein) operations are performed directly by the master control computer, which is typically composed of one or more high performance microcomputers. Signals entering and exiting the master control computer are often organized in blocks or sectors without regard to the physical arrangement of processing components in the fabrication facility. In other words, the signals for several discrete components such as a manipulator arm, a vacuum assembly and a gas box may be lumped together into blocks within the computer's control procedure. Instead of using all signals for each physical component as the basis for signal organization, the signal blocks are often organized based upon related characteristics shared by several components, such as pneumatic pressure, temperature or mass flow rate. A plurality of corresponding "motherboards" may be provided between the control computer's I/O port(s) to provide appropriate data acquisition and communication interfaces. Typically, a widely dispersed labyrinth of wires and connecting cables is threaded throughout the facility to link I/O from the various components to their respective mother boards. Because of the large number of signals, and their interdependency based upon this organizational structure, it is extremely difficult to alter one component's I/O arrangement without effecting virtually every part of the control procedure. Hence, the initial set-up of a fabrication facility for a customer, and the subsequent modification of the facility require many hours of complicated programming by highly trained personnel. Even changing the language in which text is displayed by the facility's monitor can be a daunting task.

Additionally, the present control system does not lend itself to the addition or substitution of other maker's components easily, owing to the highly proprietary nature of the physical I/O links (wire arrangement) and communication protocol (signal characteristics) between process components and the master control computer. This can limit a fabrication facility's versatility.

Finally, the present arrangement of control system hardware requires substantial floor space since several data processing devices are often employed. A variety of differing types of interfaces are also interposed about the facility. This arrangement takes up manufacturing floor space that is especially expensive in the semiconductor fabrication industry in which valuable clean room resources are required.

It is, therefore, an object of this invention to provide a control system for an automated manufacturing facility that enables ready modification of input and output signals transferred between a master control computer and the facility's processing components. The system should provide increased standardization and adaptability to the specific requirements of end-users. The systems should employ standardized control links and be adaptable to utilize known, widely available communication protocols to deliver data. The system should also enable the use of less manufacturing floor space through the thoughtful placement of hardware and the reduced need for dispersed hardware.

SUMMARY OF THE INVENTION

This invention overcomes the disadvantages of the prior art by providing an I/O control system architecture for efficiently controlling processing components of an automated manufacturing facility. The I/O system comprises to a series of modular interface cards that are linked to a master control computer. Each interface card is associated with one or more related process components of the overall facility. Significantly, each interface card is tasked to manage all of the I/O signals associated with that component or group of components. This arrangement enables all component cabling to be grouped and terminate at a single card, eliminating the undesirable cabling problems of a widely distributed, prior art I/O system. In addition, the concentration of all I/O for a component on one interface card makes the modification of process components and their I/O simpler since fewer cards must be altered to effect the modification.

According to one aspect of the invention, each interface generates a continuously variable signal list corresponding to the types of I/O and alarm signals managed. The continuously variable signal list is generated upon system start-up, and is used by the master control computer to control processes and display status and alarms for the facility. In this manner, modifications to the I/O or alarms on a given interface card are automatically entered into the master control computer's operating procedure, eliminating the need for substantial alterations to the system at the master control computer side. So long as the signal lists are generated in a format that the master control computer can understand, the master control computer will enable accurate display and manipulation of the system I/O.

In the illustrative embodiment, the master control computer includes a master CPU coupled to the interface cards, each of which includes a card CPU and a dual port RAM. The dual port RAM is interposed between the master CPU and the card CPUs, and enables two-way transfer of data between the master control computer and the interface card. The dual port RAM includes a plurality of address space blocks for receiving incoming and outgoing data related to the I/O and alarm signals. The data is continuously updated by both the interface cards or the master control computer, as changes occur. The dual port RAM also stores a database of alarm conditions upon which the master control computer can act. The master control computer, likewise, transfers interface card CPU commands through a high-address command block in the dual port RAM.

The interface cards each include one or more respective daughter cards. The daughter cards function as data translators, providing a communication link between the dual port RAM and the I/O for which the interface card is responsible. A variety of analog-to-digital/digital-to-analog converters, serial communications ports and other data acquisition components are provided on each daughter card depending on the I/O it handles. The daughter cards each translate data between a format compatible with the dual port RAM and the particular data-point format relevant to the specific I/O.

According to another aspect of the invention, the interface cards can be configured to represent data as a "web page" using appropriate network-based languages such as HTML, VRML and JAVA. In this case, the master control computer acts as a web "server" and data is manipulated using a commercially available web browser product resident on the master control computer.

BRIEF DESCRIPTION OF THE DRAWINGS

The foregoing and other objects and advantages of the invention will become clear with reference to the following detailed description, as illustrated by the drawings, in which.

DETAILED DESCRIPTION

I. Overall System Architecture

Figure 1:
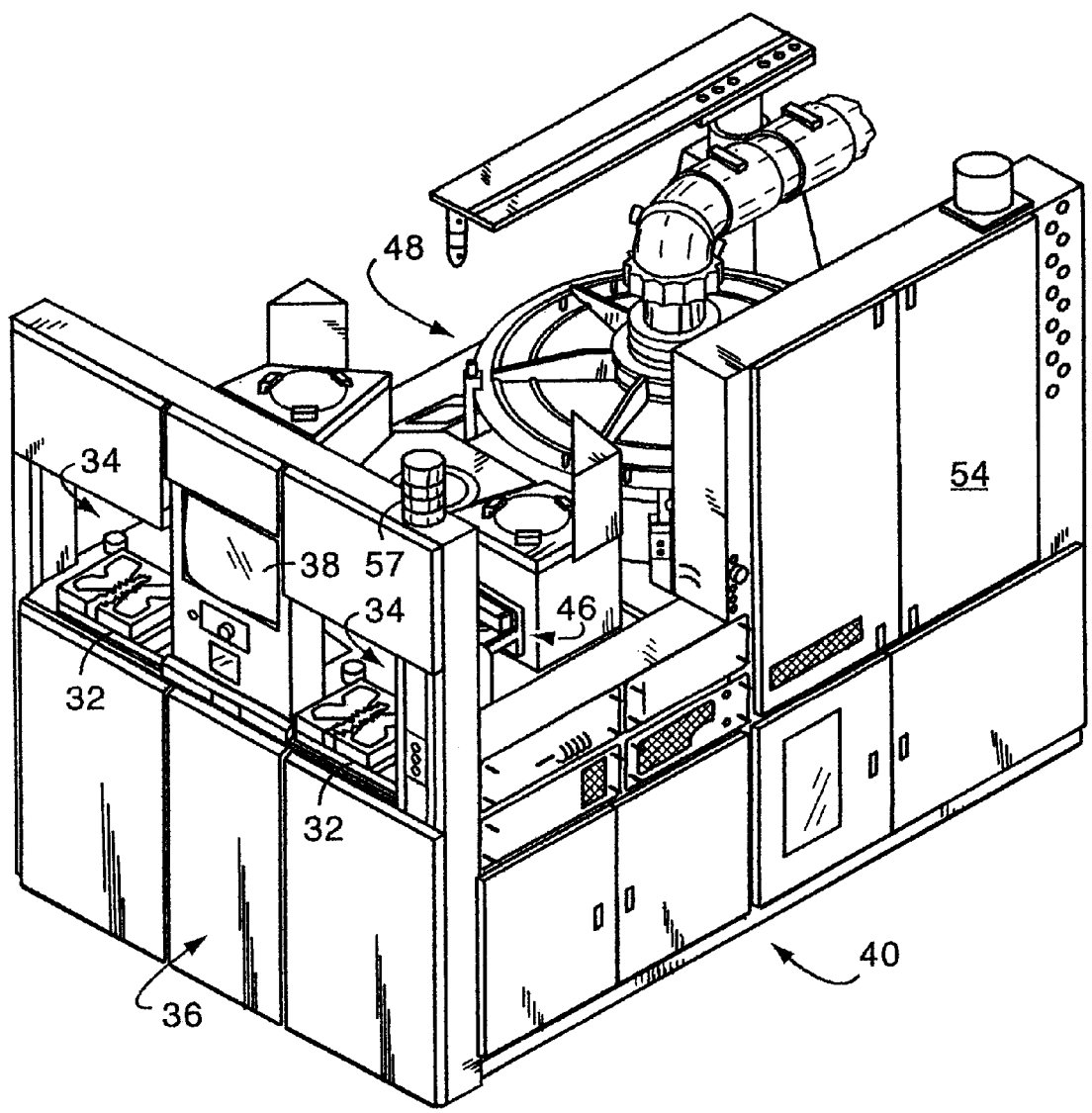
FIG. 1 is a perspective view of an exemplary semiconductor manufacturing facility having a control system according to this invention.
Figure 2:
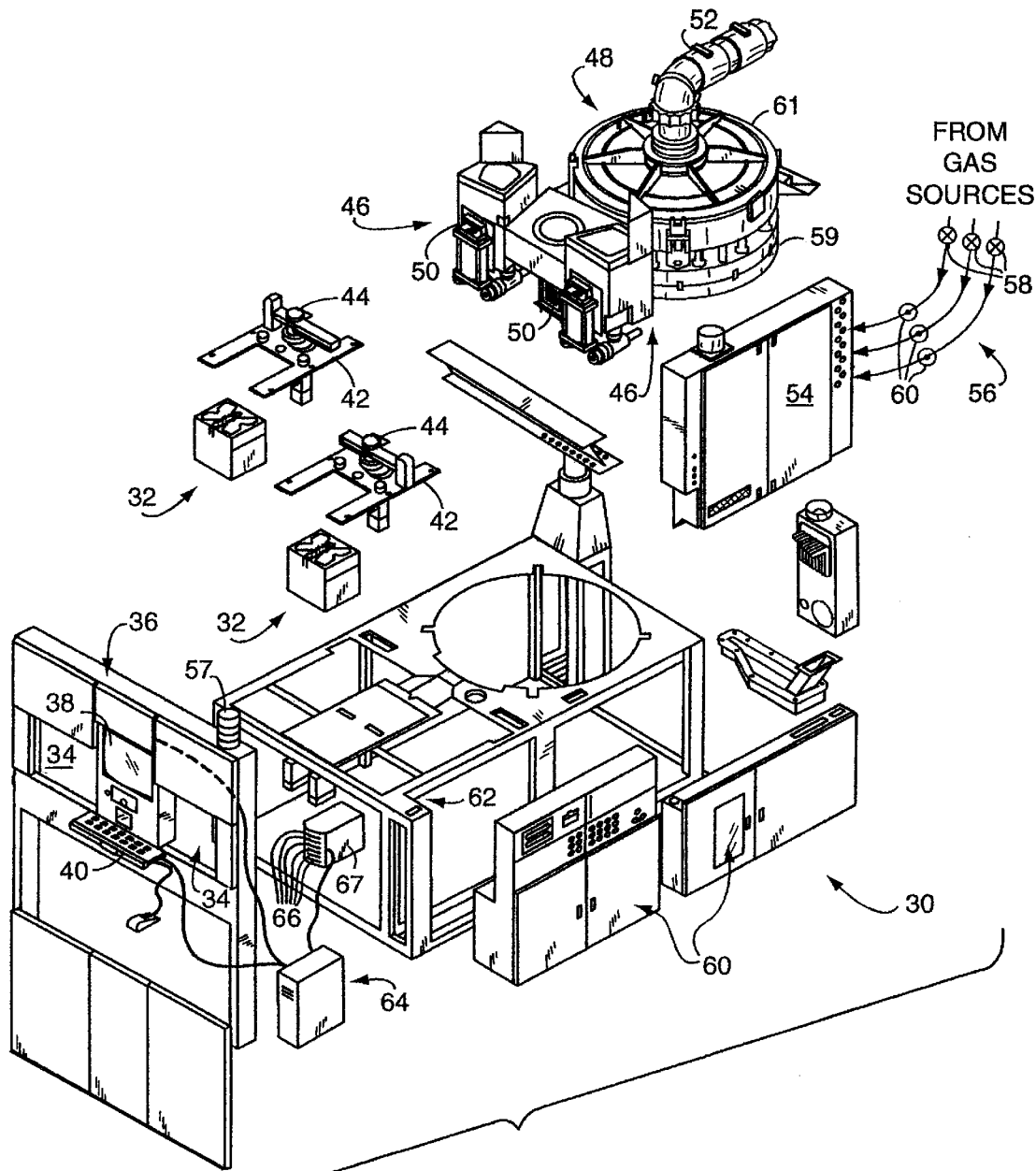
FIG. 2 is an exploded perspective view of the facility of FIG. 1.

FIGS. 1 and 2 detail an automated semiconductor fabrication facility 30 according to this invention. The term "automated fabrication facility" should be taken to include any type of manufacturing device or unit that performs multiple tasks on a workpiece, and that requires a significant number of I/O signals to be employed to control and monitor the manufacturing process. Thus, while this embodiment details the control system for a semiconductor fabrication facility, the system described herein can be adapted to a variety of other processes and products. The facility shown and described herein is a modified version of the 9800 Series fabrication system available from Lam Research of Fremont, Calif.

The facility 30 includes a plurality of interrelated, but discrete, processing components that transform a group of semiconductor wafers (not shown) from an unfinished state to a completed state with applied microcircuitry. In summary the fabrication facility includes send/receive indexers 32 that hold stacks of wafers, and that enable blank wafers to be loaded from the outside environment and finished wafers to be unloaded for further processing. The indexers 32 are accessed through respective openings 34 in a front end panel 36 that resides in an enhanced clean room environment to limit the introduction of foreign matter to the facility and wafers. An operator controls the processing of wafers by the facility at the front end panel through interaction with a monitor 38 and a data entry device such as the keyboard 40.

Each of the indexers 32 includes an associated transport mechanism 42 with a manipulator arm 44 that moves wafers between the indexer stack and a respective load lock 46. The load locks 46 act as gateways to the highly controlled environment of the semiconductor process chamber 48. The loadlocks, hence, include sealed doorways 50 that selectively open and close to enable wafer transfer into and out of the process chamber 48. Wafers enter the process chamber 48 through one of the load locks 46 upon opening of the doorway 50. The process chamber 48 of this embodiment is arranged as a circular cluster of individual reactors (not shown). There is an independently controlled reactor bottom section 59 or "toroid" and a reactor top section 61. Wafers are disposed between the sections during processing, and can be moved between reactors by an internal carousel (not shown) so that different processes can be performed, and so that multiple wafers can be processed simultaneously. Finished wafers are also removed through a load locks' doorway 50.

Vacuum levels in the process chamber 48 are carefully controlled and monitored, and a vacuum/exhaust line 52 is provided. A vacuum pump (not shown) is located at the downstream end of the line 52. Process gasses are also provided to the chamber 48 through a gas panel or "gas box" 54. The gas box 54 receives selected gasses from various upstream tanks (not shown) through lines 56. The lines 56 include automated valves 58 at one or more points along their path of travel. The valves can be pneumatically or electrically operated, like other components described herein. The lines also include signal-generating gauges at one or more locations to monitor flow and pressure. Since toxic gasses are often employed in the fabrication process, gas volumes and temperatures are carefully and fully monitored. The gas box 54 mixes, heats and regulates flow of gasses into the process chamber as required by the specific process or "recipe." Various valves, sensors and thermostatic controls (not shown) are utilized by the gas box 54.

A column of multicolored status lamps 57 is also provided at the front end panel to provide clear indications of operation and safety conditions to operators and bystanders. Other distribution and control components 60 are also provided. These are not discussed in detail, and should be known to those of ordinary skill.

Within the main framework 62 of the facility 30 is located the master control system computer 64 of this invention. The computer 64 is interconnected by appropriate data links (wires, cables, etc.) to various sensors and actuators in each of the above-described fabrication facility components. These links have been omitted for clarity, but should be known to those of ordinary skill. Parallel, serial and analog links can be provided as necessary depending upon the particular characteristics of the interconnected component. In the case of an analog circuit connection, an appropriate analog-to-digital/digital-to-analog converter is typically provided at some location along the circuit pathway.

The master control system computer 64 is interconnected by a multi-wire data line 65 with a group of interface cards 66. The cards can be organized in a frame 67 for ease of storage. They are connected with the master central processing unit ("master CPU" herein) in a manner which will now be described with further reference to FIG. 3.

The master CPU 70 according to a preferred embodiment is a commercially available Octane™ System computer available from Silicon Graphics Incorporated (SGI) of Mountain View, Calif. The Octane™ computer incorporates dual processors that continuously communicate with each other, but that enable the performance of separate tasks simultaneously, enhancing control system speed by allowing runtime processes to proceed with minimal interruptions while user interface operations are performed on a separate processor. Any acceptable master CPU can be substituted, however. The master CPU of this embodiment employs SGI's proprietary operating system, a commercially available version of the well-known UNIX™ standard marketed under the trade name IRIX™, version 6.4. The master CPU is linked to a master memory 71 and master disk storage 73 for retrieving data and instructions. The master CPU 70 incorporates an I/O parallel data bus that is configured according to the well-known PCI standard. A commercially available on-board adapter 72 converts the resident PCI bus into a 64-bit data bus 74 configured according to the well-known VME standard. It is contemplated that any acceptable bus standard can be employed according to this invention, however, and that appropriate adaptations can be made in the master CPU and associated interface cards to accommodate the particular bus standard utilized.

Figure 3:
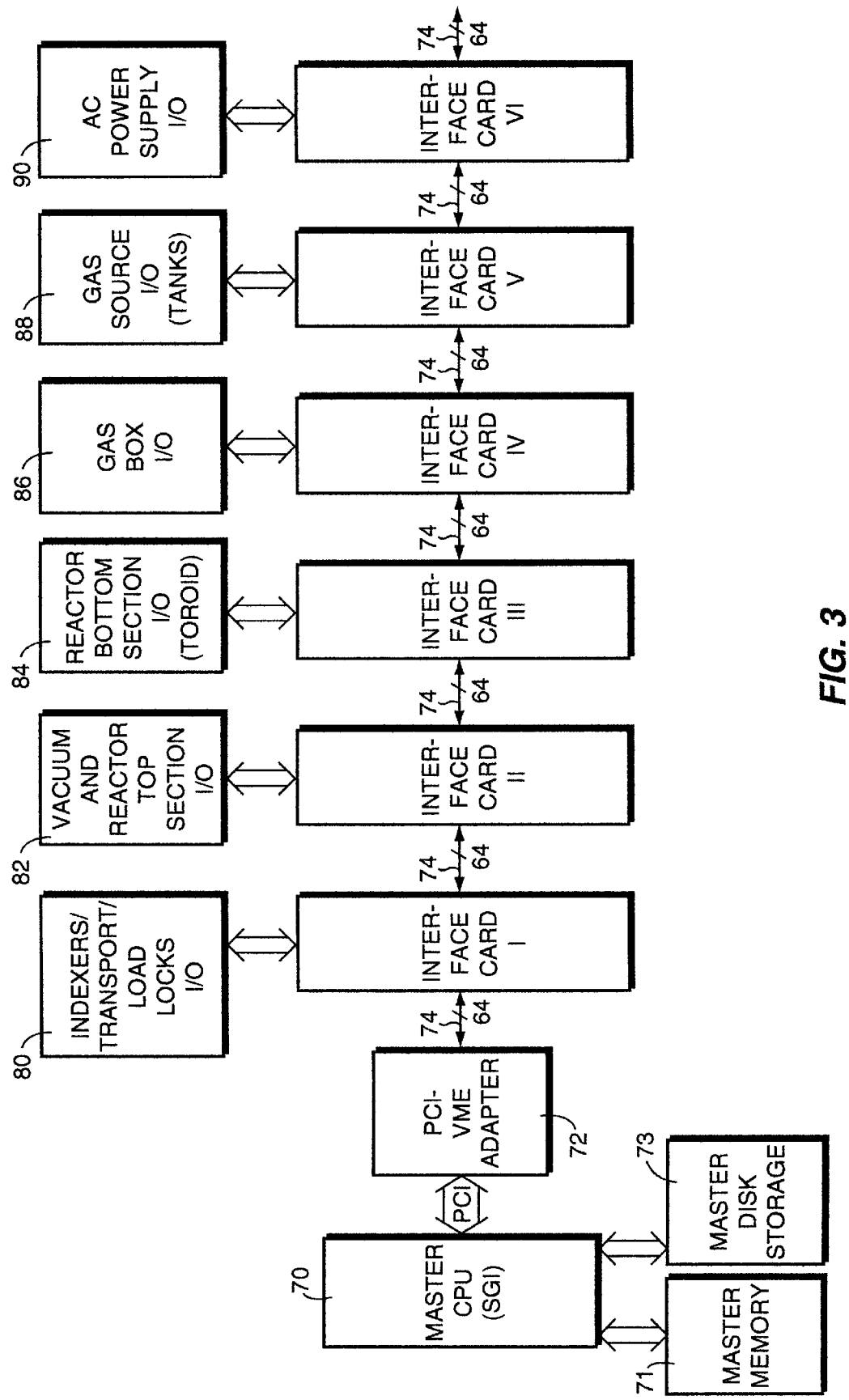
FIG. 3 is a block diagram of the master control computer, data bus and associated interface cards for the control system of this invention.

The bus 74 links the master CPU 70 with six interface cards (I–VI) in this embodiment. Each interface card is associated with a discrete physical component or group of components in the fabrication facility. Within that component, the interface card is linked with all of the resident I/O devices (sensors, robotics, pneumatics, valves, etc.) on the particular component or group of components. Thus, unlike the prior art, all links for a component are physically routed to a single interface card, or module. With reference to FIGS. 2 and 3, Interface Card I is linked by appropriate interconnections (serial, parallel or analog) to the I/O devices 80 of the indexers 32, transport mechanisms 42 and load locks 46. All pneumatic actuators, electromechanical motors, sensors, vacuum pressure and other associated I/O devices in this wafer-delivery component group transfer signals through the interface card, regardless of signal type.

In this embodiment, Card II is linked with the I/O devices 82 of the vacuum unit 52 and reactor top section 61. Functions such as process chamber environment, temperature, exhaust, pressure and movement of the chamber's manipulator system are governed through the interface card. Card III links with the reactor bottom section 59 I/O devices 84. Card IV links with the gas box 54 I/O devices 86. Process gas mass flow, gas temperature and mixing valve control are handled by this card. Card V links with the gas tanks (not shown) that feed the gas box. It interconnects with I/O devices 88 that monitor the pressure and flow of gasses and that alert for leakage. Finally, Card VI links with the I/O devices 90 AC power supply (not shown) that provides electrical power in required voltage, frequency, current and phase to the facility's components.

Other interface cards can be connected to the bus 74 to link with I/O devices on further components or subcomponents as desired. Where a component is likely to be replaced or modified, a separate interface card for that component may be desirable.

II. Interface Card Operation

Figure 4:
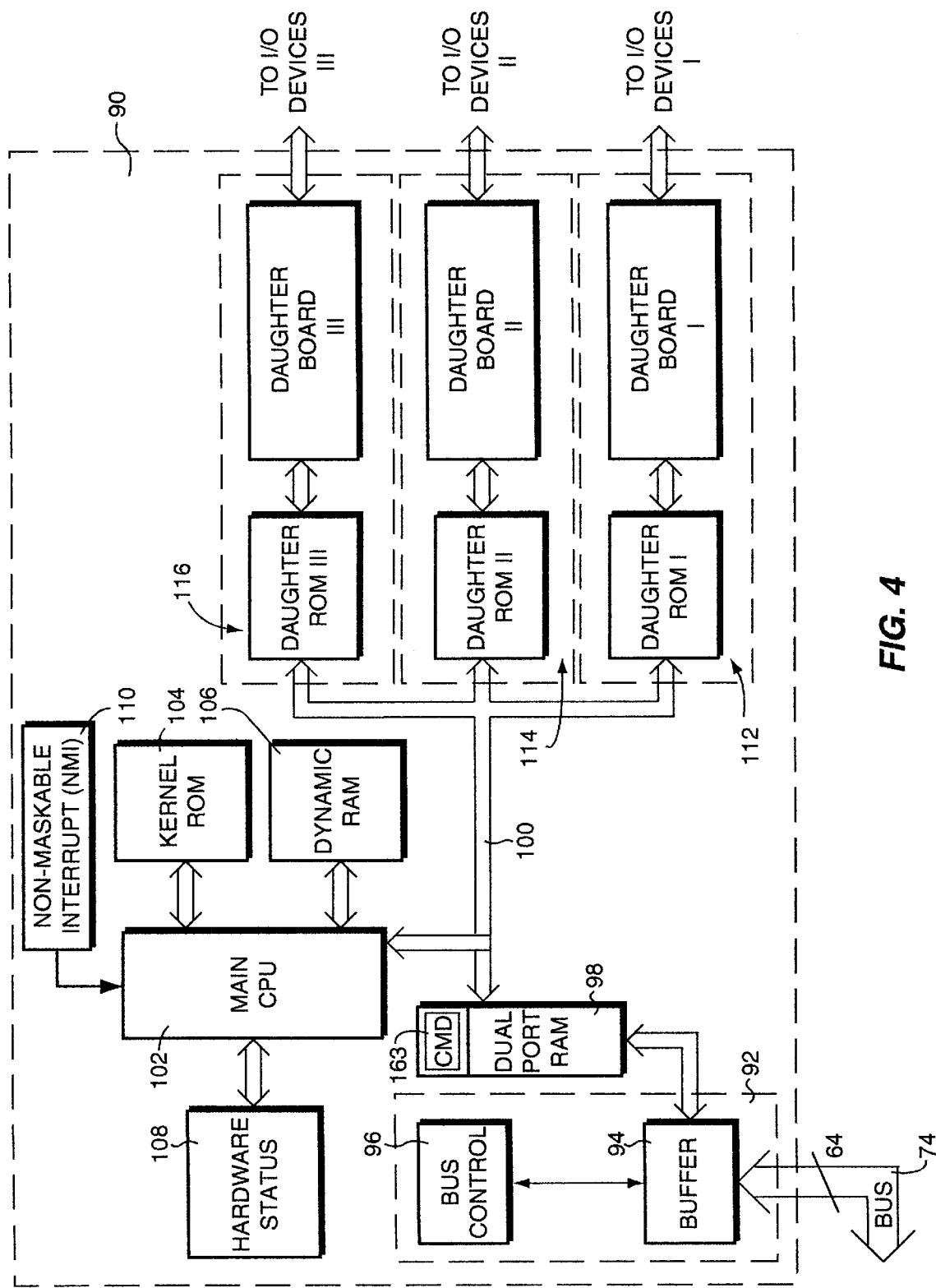
FIG. 4 is a more detailed block diagram of an interface card according to FIG. 3.

With reference to FIG. 4, a typical interface card 90 is shown in greater detail. The interface card 90 is linked to the control system VME bus by a commercially available VME bus interface circuit 92 that includes a VME data buffer circuit 94 and a VME control circuit 96. The VME buffer 92 is interconnected to a dual port RAM 98. The dual port RAM enables read and write operations to occur at two locations or "ports." A main interface card bus 100 connects the dual port RAM 98 with the card's main CPU 102. This CPU 102 can comprise any commercially available microprocessor. A 386-series microprocessor available from Intel, is provided in a preferred embodiment. Interconnected with the CPU is a read only memory or "kernel ROM" 104 and a dynamic RAM 106. As described further below, the CPU also communicates with a hardware status circuit 108 and receives inputs from a known non-maskable interrupt (NMI) 110 that cycles every 52 Khz of CPU clock cycling.

The card bus 100 is further connected to as many as three daughter board circuits 112, 114 and 116. At least one daughter board circuit is always present. Each daughter board circuit includes a corresponding daughter board ROM (I, II and III) and the actual daughter board (I, II and III). Each daughter board is specifically tailored to interface with a particular arrangement of I/O devices (I, II and III) on a facility component. The precise configuration of the daughter board is dependent upon the types of inputs and outputs encountered. Serial communications adapters, analog/digital converters and a variety of other data acquisition circuits can be present on a daughter board. In substance, the daughter board(s) for each interface card act as a "mother board" for interfacing with the I/O devices for a particular component. Typically, additions and changes to I/O parameters are accounted for by changing or modifying one or more daughter boards on a given interface card. The term "parameters" as used herein refers to data points transferred from and to the I/O in a desired format with desired units, etc. For example the "parameters" of a mass flow sensor include the flow rate, the units of flow and the range of permissible/possible values. The parameters of a transport unit are the movement values between locations provided in x,y coordinates or another recognized standard of reference. In general, any data necessary to effectively read or operate an I/O are considered the parameters of the I/O. As will be seen, the localized modification of daughter boards is the only substantial modification required to effect system-wide change. This result from the adaptive nature of the interface cards and the master CPU, both of which enable I/O parameters and signal lists to be modified continuously with little or no changes to the underlying control system procedure.

Figure 5:
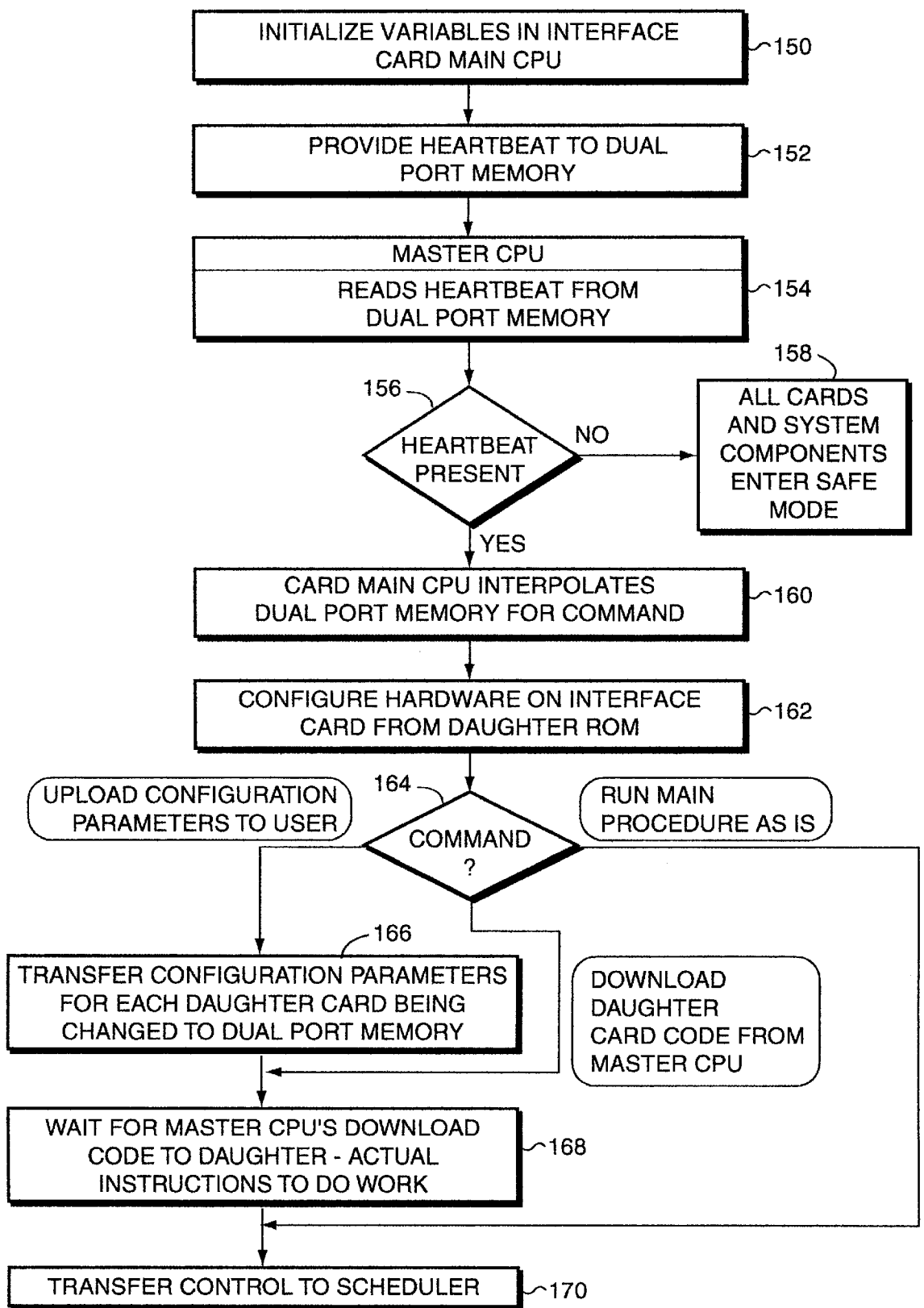
FIG. 5 is a flow diagram of the initialization of the control system according to this invention.

With reference to FIGS. 4 and 5, at start-up, or based upon a command for reinitialization, the system responds by causing each interface card to initialize its own on-board main CPU 102 as detailed by block 150. If no errors or malfunctions in any hardware or I/O are detected, then the card writes a "heartbeat" flag to the dual port RAM 98, as detailed in block 152. The heartbeat can be any acceptable byte code located at an address that is known by the master CPU. The master CPU polls for the heartbeat on the dual port RAM 98 via the bus 74 in block 154. The heartbeat must be detected within a predetermined time (for example, 500 msec.). According to decision block 156, it the heartbeat is not detected, then the entire control system is placed into "safe" mode as indicated by block 158. Safe mode prevents any operation by the facility. This is accomplished to reduce the risk of toxic gas leakage or other unsafe conditions inherent in the operation of the facility. If the heartbeat occurs on schedule, then the procedure continues into blocks 160 and 162 in which the card's main CPU 102 polls the command address (163 in FIG. 4) of the dual port RAM for any commands received from the master CPU. At this time, commands generally relate to initialization functions. The card also configures any hardware on the interface from the daughter ROM. This is described further below.

Decision block 164 recognizes three generalized commands. If there is no change in interface card parameters (e.g. no I/O or alarm parameters have occurred), or if the Master CPU is aware of the existence of changes on a card since the last initialization cycle, then the command to upload the latest card configuration parameters is given, and these parameters are transferred into the dual port RAM 98 from the daughter ROM and dynamic RAM 106 as shown in block 166. As described further below, the master CPU reads the latest list of parameters for the card, and acts upon it to generate its own new signal list of I/O and alarms. The master CPU then transfers a download confirmation code back over the bus 74 in block 168. This code can include the received signal list or other commands. It can also include further updates to the card's parameters to be loaded into the daughter cards. Instructions to perform work are transferred at this time. Finally, in block 170 the card transfers control to its scheduler procedure that loops through a series of tasks that perform work and gather data using the I/O. Information is continuously transferred between the master CPU and each card at this time. Note that the same procedure is occurring on each of interface cards I–VI, in turn. The underlying initialization procedure described above is essentially the same for all cards.

Referring again to decision block 164, if the command received from the master CPU specifies that daughter card code be loaded onto the master directly, then the procedure branches directly to block 168. In this case, there are changes to parameters to be added directly from the user interface, and the daughter cards receive the modified data and act upon it. The scheduler then takes over operation in block 170.

Finally, if the decision block 164 receives a command to run the main procedure "as is," then the procedure simply branches to the scheduler and operates based upon preexisting data and commands.

Figure 6:
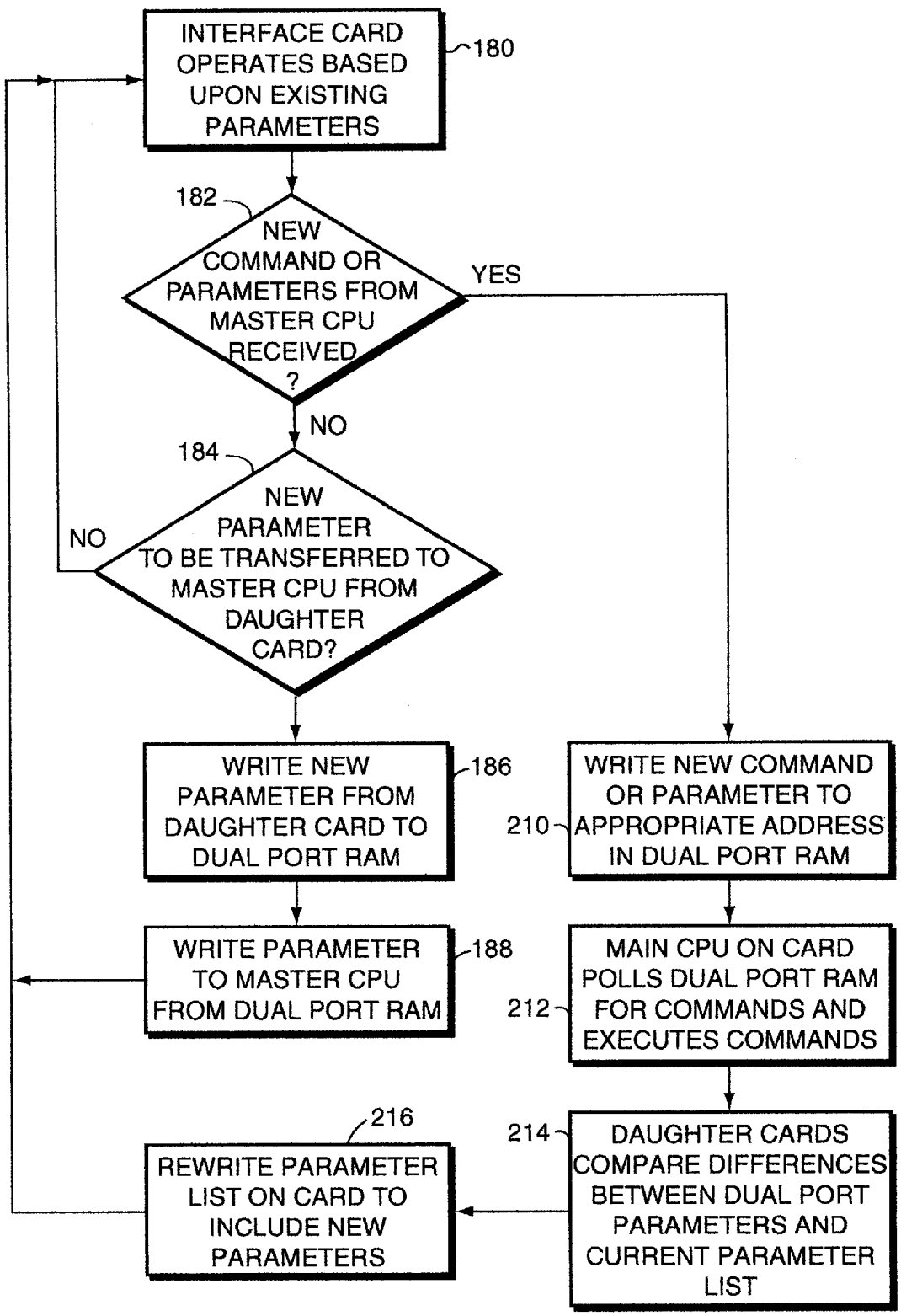
FIG. 6 is a flow diagram of the operation of an interface card during runtime according to this invention.

FIG. 6 shows the operation of the interface card following initialization. The interface card operates based upon existing parameters as detailed in block 180, until new parameters or commands are provided by either the daughter cards I–III or the master CPU. The main card CPU 102 follows a scheduling procedure, described below, that transmits new parameters to the master CPU and receives commands and parameters form the master CPU at predetermined times. This operation is represented by the decision blocks 182 and 184. When a new parameter arises in one of the daughter cards, representative of a change in one of the existing signal values (set up at initialization described above), the parameter is written into the appropriate address in the dual port RAM 98 as described in block 186. The master CPU polls the dual port RAM 98 over the bus at selected times, and detects changes in parameters as they occur. The updated information is acted upon by the master CPU in block 188.

Figure 7:
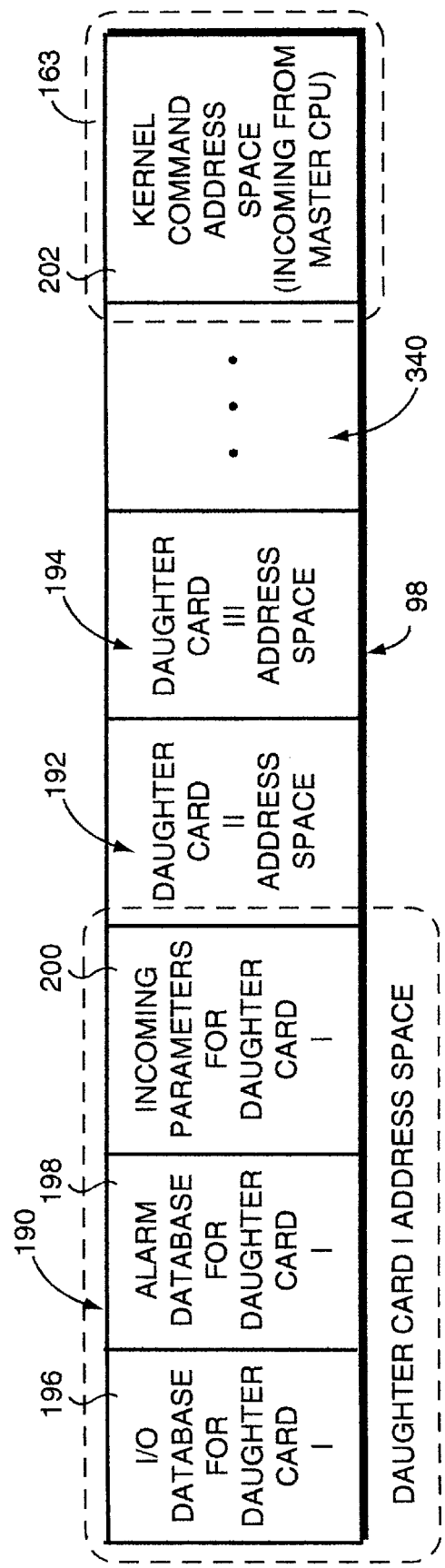
FIG. 7 is a schematic diagram of dual port RAM storage locations for an interface card according to this invention.

If a command or parameter is transferred over the bus to the interface card, then the command is provided to an appropriate address within the dual port memory. With further reference to FIG. 7, the dual port RAM on each interface card is organized by daughter card. As noted above, the number of daughter cards on a given interface card can vary. The card 98 includes three cards, and therefore, three address blocks 190, 192 and 194. Each address block is divided into an I/O database 196 that stores current parameter values for the daughter card's I/O signals. An alarm database block 198 is also included. Alarm signals are discussed below. In summary, the alarm signals are status indicators of an important nature indicating unallowable minimum or maximum values in I/O devices. Additionally, each daughter card address block includes a block 200 for incoming parameters from the master CPU via the bus. The incoming parameter block 200 is polled by the daughter cards, and new parameters are entered into the daughter card memory. The daughter card memory can include on-board memory on the particular daughter card and locations in the interface card's dynamic RAM 106. When entered, the parameters are written into the I/O database block 196 of the dual port memory, in a manner similar to that shown in blocks 186 and 188.

Similar address block arrangements are provided for daughter card II's block 192 and daughter card III's block 194. At the highest address locations within the dual port memory 98 are provided the command block 163 with address locations 202 sufficient to accommodate all incoming commands for directing the main card CPU. These commands are used to operate the interface card to perform various functions such as power shut off and card main CPU control.

Referring again to decision block 182 in FIG. 6, commands and parameters received from the master CPU, via the bus are written directly to the appropriate address location in the dual port RAM (block 210). Commands are written to the command block 163. The card main CPU polls the command block at selected times, and executes received commands (block 212). Parameters are, likewise, written into the appropriate address of the incoming parameter block for each daughter card (block 210). The daughter card memory polls the dual port memory, and compares the received parameters with current parameters (block 214). If a parameter has changed, the rewritten parameter is loaded into the daughter memory (which consists of on-board daughter card memory and the dynamic RAM 106) depending upon the address (block 216). The rewritten parameters are also written into the I/O database block for each daughter card as described above.

The I/O database stores parameter as a descriptor and value. The descriptor is a data string that includes OFFSET-NAME-FORMAT-SIZE-MIN-MAX-UNITS-DIRECTION-BITMASK-CRYPTOVARIABLE-COMPRESSION-DISPLAYAGE-NEXT, in the present embodiment. OFFSET is the offset in the dual port memory from memory location 0. The NAME is a character string representative of the particular parameter—for example, "TEMP_HEAT_1_CHANNEL_A." FORMAT is the manner in which the data of the value is formatted such as None, Character, UCharacter, Short, UShort, Integer, Unsigned Integer, Long, Unsigned Long, Float, Double, String, Special I/O, Enum, BitField, Cryptovariable or Compression. SIZE is the size in bytes of the value string, enum or bitfield. SIZE is set to zero if the FORMAT is not Enum, String or BitField. MIN and MAX are values specified by the user interface to prevent entry of out-of-range values. UNITS is a string expressing the standard units of the value, such as "s" for seconds or "min" for minutes. A value of 0 represents no units. DIRECTION is the direction of the parameter (e.g. IN or OUT of the interface card). BITMASK is used in conjunction with the BitField format. A bitfield is used to minimize redundant reads of the dual port memory. Setting BITMASK to 1 indicates use of a bitfield. CRYPTOVARIABLE indicates the use of RSA or other encryption of the data. Likewise, COMPRESSION indicates use of a data compression method. Finally, DISPLAYPAGE represents a "page," taken from a group of maintenance pages in which the I/O parameter is displayed. This enables access of the parameter by a user to monitor whether the underlying system procedures are executing properly.

The value is a data string of the actual value of the parameter in its "native" format, as defined by the FORMAT descriptor above.

Figure 8:
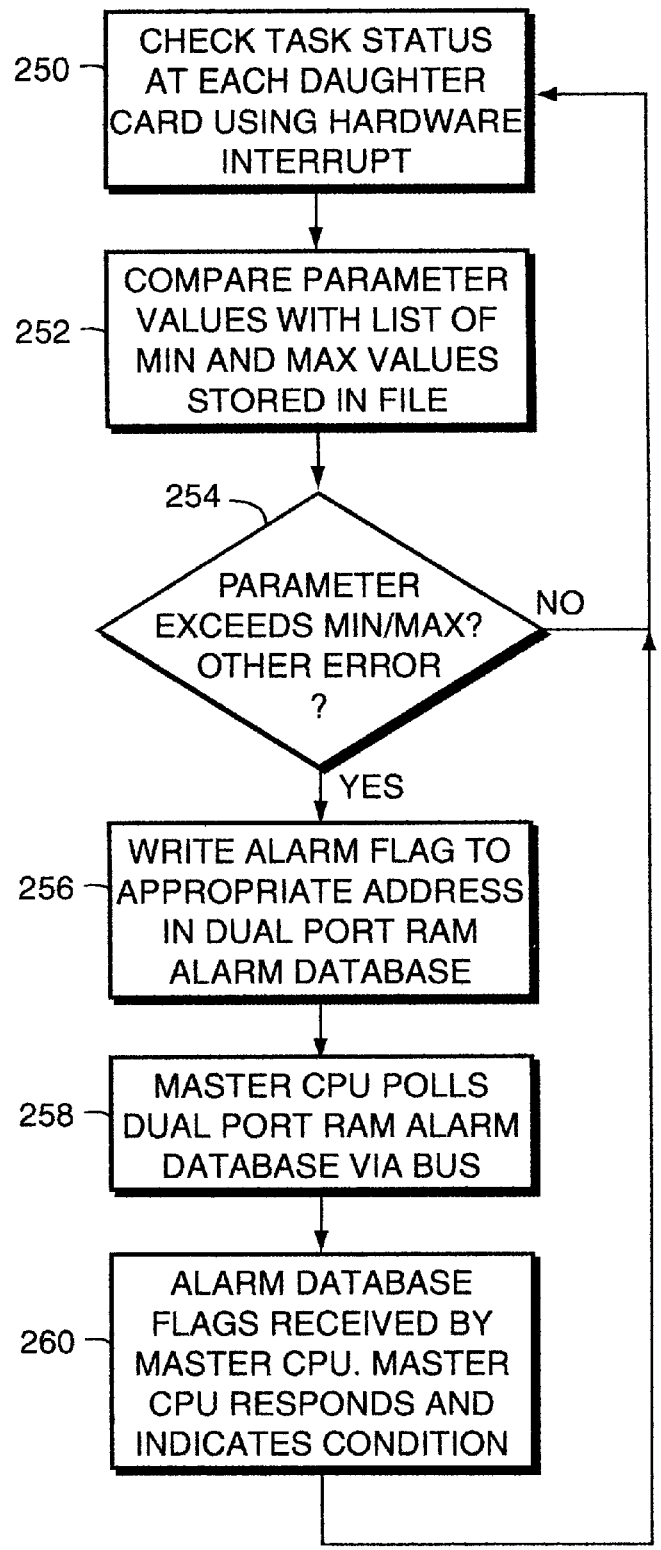
FIG. 8 is a flow diagram of the alarm procedure for an interface card according to this invention.

FIG. 8 details the generation of alarm conditions within an interface card. The card main CPU periodically checks the status of the daughter cards by executing a hardware interrupt that freezes the state of the daughter cards (block 250). The present values of selected parameters are compared with a list of accepted minimum and maximum values already provided (block 252). The values can be stored in a table or file that is resident in either the master CPU or interface card. If a parameter exceeds a specified minimum or maximum (block 254), then an alarm flag is written to the alarm database block in the dual port RAM for the appropriate daughter card (block 256). The master CPU polls the dual port alarm database block for each daughter card (block 258). Any alarm is acted upon by the master CPU and displayed to the operator in a readable form (block 260).

The alarm data strings are stored as SET-NEXT-ALCD-TEXT, wherein SET determines the presense or absence of an alarm condition; NEXT indicates the offset in the dual port memory from memory location 0; ALCD ("alarm-code") is a code indicating the type of alarm; and TEXT is a 50-character ASCII string that is displayed by the master CPU when the alarm is set. The text and other aspects of the alarm can be varied, and are set at initialization, along with other parameters. This enables text messages to be easily customized, and presented in the desired language or graphical form.

Figure 9:
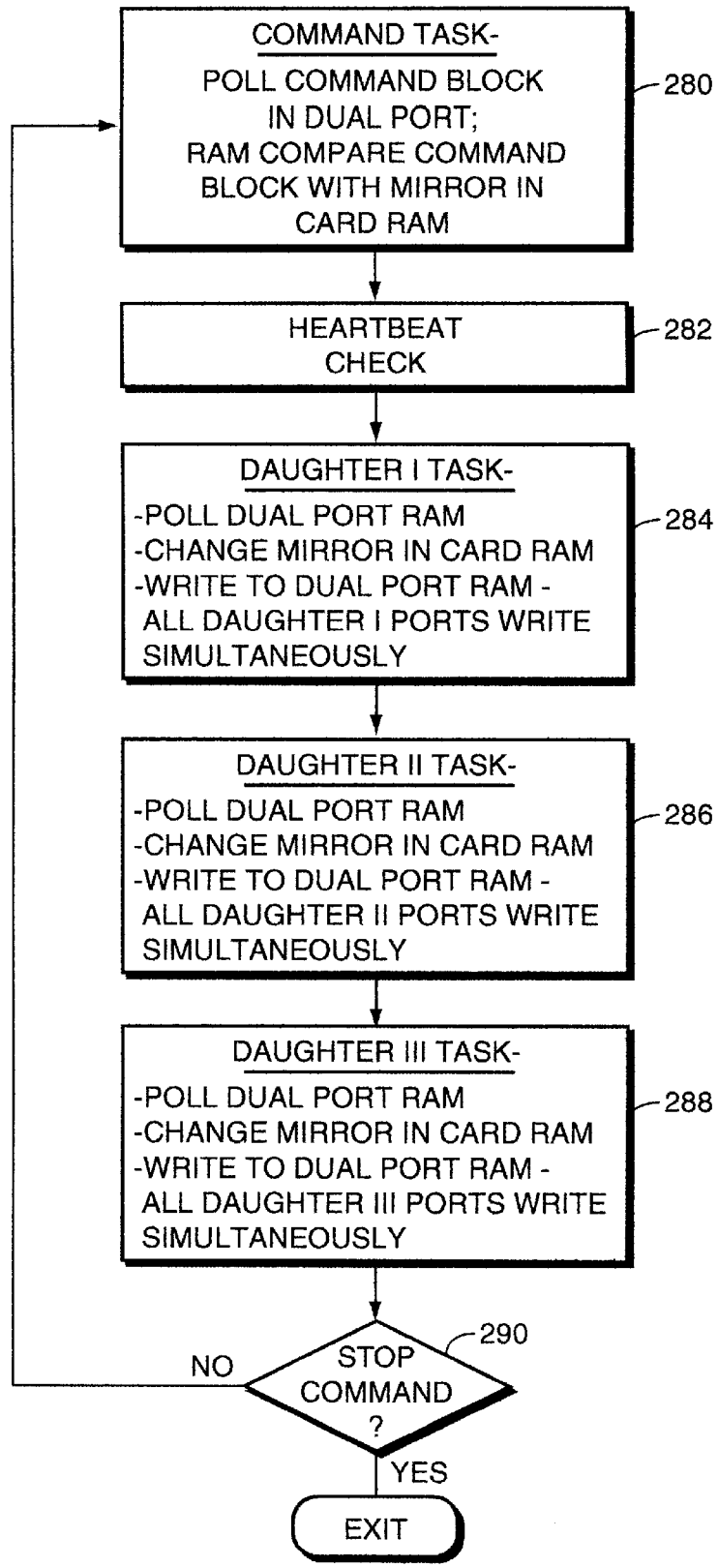
FIG. 9 is a flow diagram of the performance of specified tasks by an interface card according to this invention.

In the present embodiment, the ALCD code (2 bytes) can represent the following conditions:

0—Unused Alarm
1—Personal Safety Alarm
2—Equipment Safety Alarm
3—Parameter Control Warning Alarm
4—Parameter Control Error Alarm
5—Unrecoverable Error Alarm
6—Equipment Status Warning Alarm
7—Attention Flag
8—Data Integrity Alarm
9–63—Reserved Alarms FIG. 9 details the task structure of the interface card of the present embodiment. The task cycle begins with the command task (block 280). The card main CPU polls the dual port RAM for any incoming commands, comparing the command list in the dual port command block 163 into a mirror of the command block stored in the card dynamic RAM 106. Differences are written into the mirror and acted upon by the card main CPU. The heartbeat check task occurs next (block 282). As described above, a heartbeat signal is transferred between the card and the master CPU via the bus. If the heartbeat exchange is not completed within a predetermined time (such as 500 milliseconds), then the system is instructed to shut down and/or provide an alarm to prevent damage to equipment and possible injury.

Once the command and heartbeat tasks have been completed, then the card performs daughter tasks. The daughter tasks are generally accomplished for each daughter card (I, II and III) in turn. Tasks related to Daughter Card I occur first (block 284). Specifically, the daughter card polls the dual port RAM to read any parameter changes. The changes are loaded into the mirror of parameter values stored in the daughter RAM. New parameter values are then written into the appropriate address locations of the dual port RAM. All serial ports on a given daughter card write to the dual port RAM simultaneously in this embodiment. Any alarm flags are also written into the alarm database addresses for Daughter Card I. A similar series of steps then occurs for Daughter Card II (block 286) and for Daughter Card III (block 288).

Each daughter card is provided with three hardware interrupt output ports interconnected with the main card CPU. The task cycle can be interrupted at any time by providing an interrupt signal. Likewise, a stop command can be provided at the end of each task cycle as indicated by decision block. A stop cycle causes the procedure to exit, and await further instructions. Otherwise, the cycle continues, returning to a new command task (block 280). Generally, a task may not be completed before the next task begins. The scheduler procedure dictates the beginning and end of each individual task.

Figure 10:
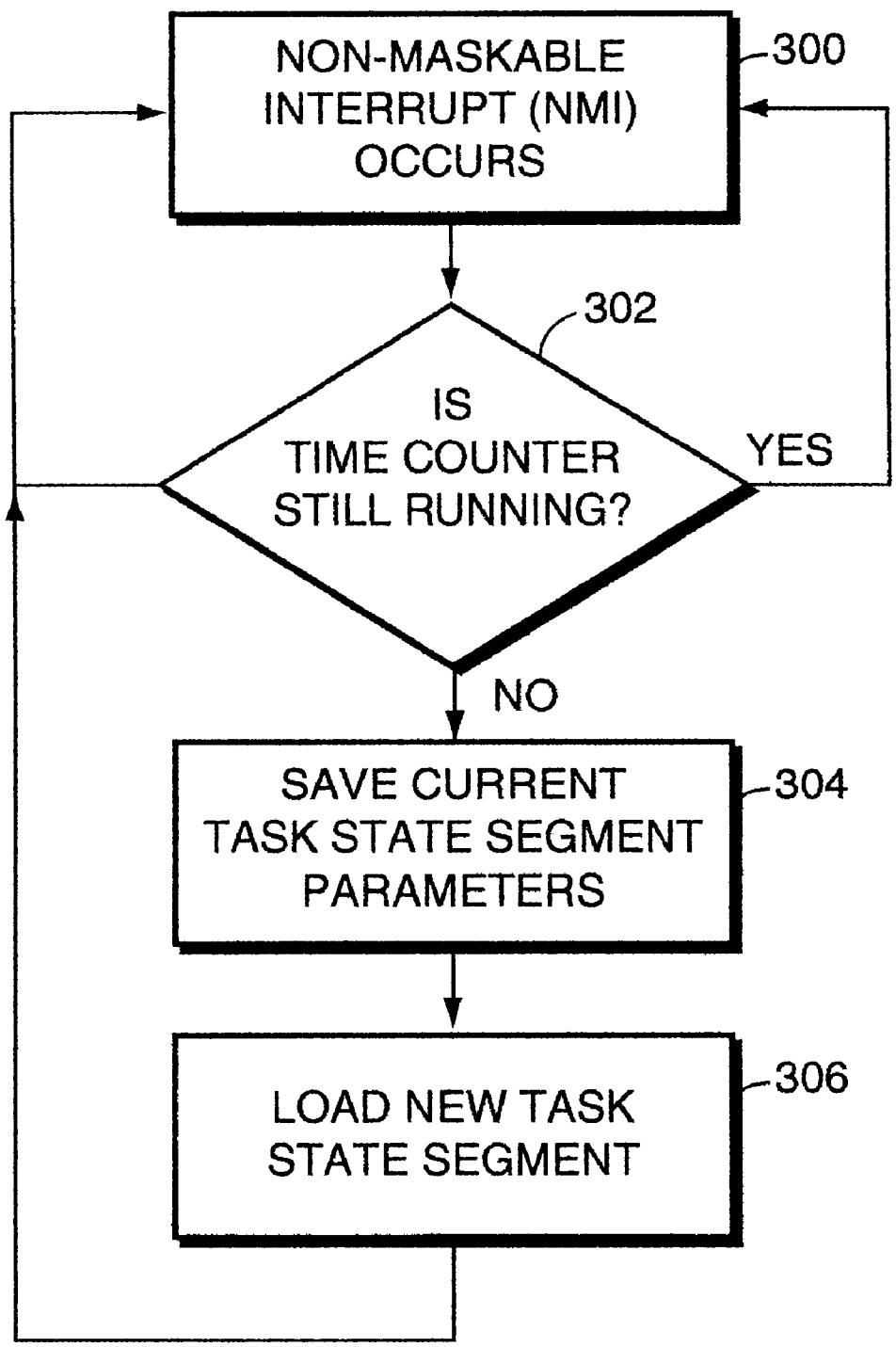
FIG. 10 is a flow diagram of the operation of the scheduler to direct the tasks described in FIG. 9.

Referring to both FIGS. 4 and 10, the card scheduler procedure is now described in greater detail. The card main CPU 102 receives a preset non-maskable interrupt 110 at 52 Khz intervals. The non-maskable interrupt cannot be overridden. It freezes the processor in its current data state for a short time period. As each non-maskable interrupt occurs (block 300), the CPU checks for the completion of a timer cycle (decision block 302). When the timer cycle has elapsed, then the current task state segment parameters are saved in the card's dynamic RAM 106 (block 304). The task state parameters include a pointer that contains the current location in the dual port RAM (e.g. the address of the particular block which is currently being acted upon) and various registers for all necessary variables for the particular task. This saved information includes the current parameters being read or written. In essence, the system saves a "snapshot" of the current task as it is in progress. The next task state segment parameters are then loaded (block 306), along with the next pointer to the dual port RAM. In other words, the previous "snapshot" of the next task in the group is loaded, and that task begins from whence it ended previously. Naturally, the pointer jumps in the dual port memory to access the block that is relevant to the next task. The scheduling procedure runs until a stop command or other interrupt occurs.

III. Master Control Computer

Figure 11:
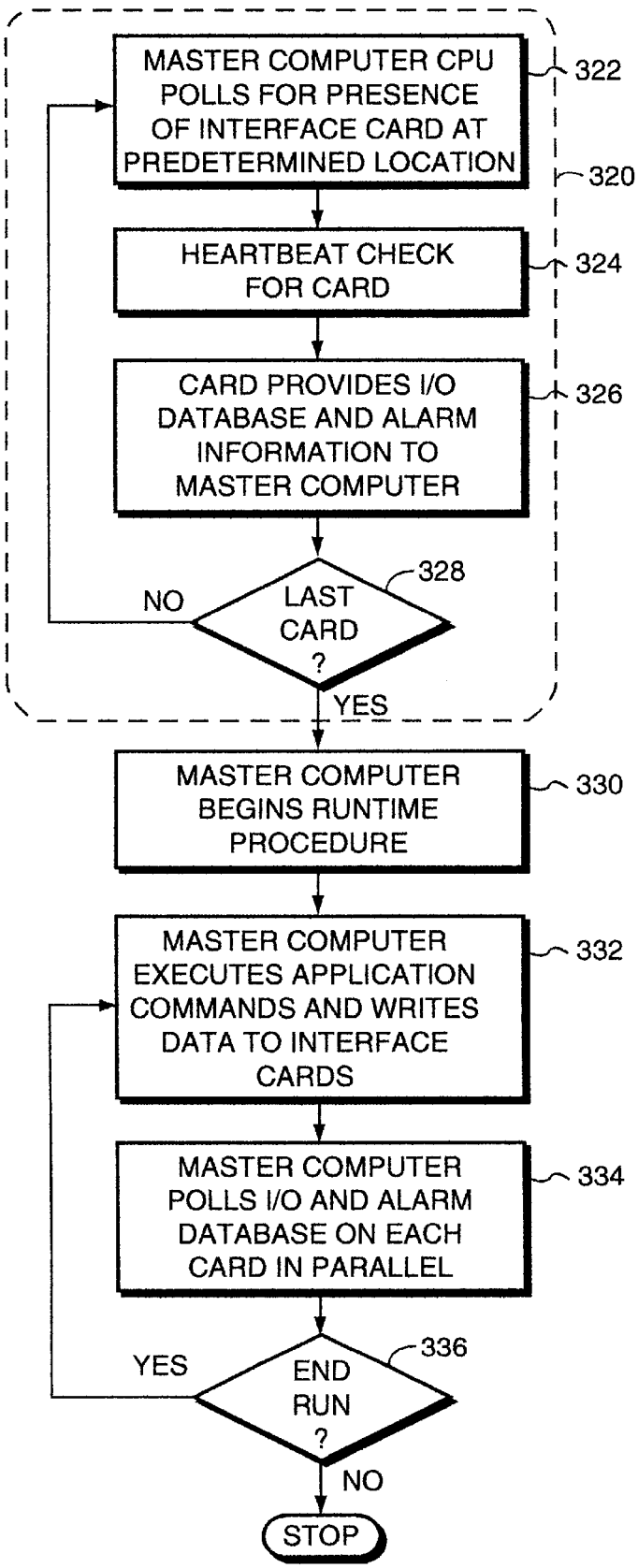
FIG. 11 is a flow diagram of the initialization and runtime procedures of the master computer according to this invention.

Having described the operation of the interface cards of this embodiment, the operation of the master control computer and its CPU is now described. Like the interface cards, the master CPU executes an initialization procedure which is described in block 320 of FIG. 11. First, the master CPU polls for the presence of an interface card at a first predetermined bus address (block 322). The master computer performs its part of the heartbeat check (block 324). As discussed previously, any failure to successfully complete a heartbeat exchange causes immediate shutdown of the system. Addressing the selected interface card, the I/O and alarm databases in the card's dual port RAM are polled for parameters (block 326). At this time, the initial signal list is established based upon the existing descriptor-value structure of each entry in the database. The initialization procedure loops until decision block 328 determines that all interface cards have been polled and all their data has been entered into the master computer's database. In this embodiment, interface cards are placed at one megabyte bus address intervals so that locations are known in advance by the master CPU. Interface cards can be easily added and subtracted from the overall system according to this arrangement.

Note that the signal list and alarm list, according to this embodiment, is generated initially by the interface cards. The master computer adapts itself to the received signal list by setting up appropriate displays and user interface functions for manipulating the I/O on each card. The parameters that control display and manipulation are included in the card's database, accessed by the master computer through the dual port RAM. Hence, I/O and alarms can be added and deleted from the system with no change to the hardware or applications resident in the master computer.

Following initialization, the master computer begins its runtime operating procedure (block 330). The master computer first executes commands and transmits commands and data to the appropriate interface card (block 332). This data enters the command, alarm and I/O database blocks of the dual port memory. Each interface card, underlying daughter card, and block defines a unique address on the bus. The master computer then polls the dual port RAM on each card to update the alarm and I/O databases resident in the master memory (block 334). Polling of interface cards, in general, can be accomplished in parallel. The loop continues throughout the operating run. Decision block 336 exits the loop when an end program command is provided to the master computer. A system interrupt or certain alarms will also cause the run to terminate.

IV. Network Communications

It is contemplated that the exchange of information between the interface cards and the master computer can occur according to a known communication protocol. Accomplishing communication with a standard protocol can further enhance the ready change of I/O and alarm parameters. In particular, it enables users to provide modifications to interface cards (such as the addition of new I/O or alarms) that use well-recognized, widely available commercial standards for data transfer.

The dual port RAM in each interface card is provided with an upper memory region 340 (FIG. 7) that enables the interface card to operate as a so-called "web site." In other words, the card can provide data in a format compatible with a commercially available network browser. Unlike most networks, in which a serial connection links the web sites to a browser via an ethernet, the network of this embodiment is structured around the parallel VME bus 74. The CPU is provided with software that enables the creation of files in the dual port RAM, based upon the I/O and alarm database blocks in a network-compatible format such as the well-known Hypertext Makeup Language (HTML) or the three-dimensional counterpart VRML. These files are written into the upper memory region 340 of the dual port RAM. In addition, the interface cards are provided with applications to generate byte codes that can be formatted in a network-compatible programming language such as the commercially available JAVA® language available from Sun Microsystems. Unlike most conventional network configurations in which the "server" generates JAVA byte codes that are executed by a remote "client," the codes are generated by the "client" side in this arrangement, and the codes are provided for execution by the "server" side (the server corresponding to the master computer and the clients being the interface cards). Typically, JAVA codes form "aplets," small, non-executable applications that allow information to be transferred from the card, where it is created, to the master computer. Aplets include start, stop and suspend commands for directing the browser, normally absent from normal applications. These JAVA byte codes are stored in selected locations in the dual port memory.

A conventional web browser, such as the Navigator™ browser product commercially available from Netscape, is installed on the master computer. During runtime operation, the browser manipulates a pointer that polls address locations in the dual port RAM for HTML, VRML and JAVA-based file information. This information is displayed on the master computer display as a "web page." Thus, information regarding I/O and alarms can be displayed and manipulated by the user through operation of the browser. Files are uploaded continually to the master computer from the interface cards, which contemporaneously maintains them in a variety of formats including HTML, VRML and JAVA. As files are updated through manipulation of web pages, the information is transferred back into the dual port memory, and translated into a format that is readable by the daughter cards, as detailed above. The translated information is stored in the incoming I/O database blocks for each daughter card. The resulting bus-based network arrangement is fast-operating, providing an effective and versatile system for controlling a complex system of I/O.

The foregoing has been a detailed description of a preferred embodiment of the invention. Various modifications and additions can be made without departing from the spirit and scope of this invention. For example, the dual port RAM can be replaced with another type of memory structure. The master computer can comprise any one of a variety of central processor and memory devices. The bus used to interconnect components can conform with a variety of standards and can be implemented in a number of different bit-sizes. Similarly, the communication protocols and user interfaces used herein can be varied to suit the particular system. Finally, while the components shown herein are used in connection with a semiconductor fabrication facility, the system shown and described herein is applicable to any automated fabrication facility using differentiated I/O. Accordingly, this description is meant to be taken only by way of example and not to, otherwise, limit the scope of the invention.

What is claimed is:

1. A control system for an automated manufacturing facility having a plurality of components, each of the components having I/O located thereon, comprising:

a master control computer having a master CPU and a master memory;

a parallel bus interconnected with the master control computer; and a plurality of interface cards, each interconnected to the bus, each of the interface cards being interconnected with the I/O of at least one of a plurality of respective components, and each of the interface cards including a card CPU thereon and a RAM, wherein the RAM enables two-way data transfer between the master CPU and the interface card; and at least one daughter card located respectively on each of the interface cards, each daughter card being interconnected to receive and send data from the RAM, each of the daughter cards including data translation circuits for translating data between a data compatible with the master CPU and a data relevant to the interconnected I/O.

2. The control system as set forth in claim 1 wherein the RAM comprises a dual port RAM.

3. The control system as set forth in claim 1 wherein the RAM includes a plurality of address locations for storing data transmitted to and received from the I/O and for storing commands for operating the card CPU.

4. The control system as set forth in claim 3 wherein the master CPU includes an interface for displaying data received from the RAM at predetermined intervals and for entering data and commands, the data and commands being transmitted to the RAM at predetermined intervals.

5. The control system as set forth in claim 1 wherein the plurality of components include a semiconductor manufacturing reaction chamber, a semiconductor manufacturing reaction gas box and a semiconductor wafer transport mechanism.

6. The control system as set forth in claims 1, wherein all cabling associated with a component are grouped and terminated at a single interface card.

7. The control system as set forth in claim 1, wherein a different translation is performed by changing the daughter card.

8. The control system as set forth in claim 1, wherein the interface card is configured to generate a heartbeat and wherein the master CPU monitors the heartbeat and if the master CPU fails to detect the heartbeat, the master CPU causes the control system to be placed in to safe mode.

9. A method for controlling I/O located on a plurality of components in an automated manufacturing facility comprising steps of:

establishing a master control computer, including a master memory and a master CPU;

communicating over bus with a plurality of interface cards including organizing the interface cards so that I/O of a predetermined of the components or a predetermined group of the components are all interconnected with a single respective of the interface cards;

defining parameters for each of the I/O during the step of communicating at each of the interface cards; translating parameters between a data compatible with the master CPU and a data relevant to the I/O;

transmitting each of the parameters to the master control computer;

displaying information based upon selected of the parameters by the master control computer subsequent to the step of defining, during the step of communicating;

transmitting selected updated parameters to the interface cards from the master control computer subsequent to the step of defining, during the step of communicating.

10. The method as set forth in claim 9 wherein the step of communicating includes writing parameters to and reading parameters from each of a plurality of dual port RAM circuits located, respectively, on each of the plurality of interface cards.

11. The method as set forth on claim 9, farther comprising the step of:

grouping and terminating at a single interface card, all cabling associated with a component.

12. The method as set forth in claim 9, further comprising the step of:

performing a different translation by changing the daughter card.

13. The method as set forth in claim 9, further comprising the steps of:

causing the interface card to generate a heartbeat; and causing the master CPU to monitor the heartbeat, wherein if the master CPU fails to detect the heartbeat, the master CPU causes the control system to be placed in to safe mode.

* * * * *